(12) United States Patent
Mentovich et al.

(10) Patent No.: US 10,361,777 B2
(45) Date of Patent: Jul. 23, 2019

(54) SYSTEM FOR TESTING OPTICAL TRANSMITTERS

(71) Applicant: Mellanox Technologies, Ltd., Yokneam (IL)

(72) Inventors: Elad Mentovich, Tel Aviv (IL); Itsik Kalifa, Ramat Gan (IL); Kfir Margalit, Rehovot (IL)

(73) Assignee: MELLANOX TECHNOLOGIES, LTD., Yokneam (IL)

( * ) Notice: Subject to any disclaimer, the term of this patent is extended or adjusted under 35 U.S.C. 154(b) by 0 days.

(21) Appl. No.: 15/820,807

(22) Filed: Nov. 22, 2017

(65) Prior Publication Data
US 2019/0158174 A1 May 23, 2019

(51) Int. Cl.
*H04B 10/50* (2013.01)
*H04B 10/075* (2013.01)

(52) U.S. Cl.
CPC ........... *H04B 10/075* (2013.01); *H04B 10/50* (2013.01)

(58) Field of Classification Search
CPC combination set(s) only.
See application file for complete search history.

(56) References Cited

U.S. PATENT DOCUMENTS

| | | | | |
|---|---|---|---|---|
| 2002/0025100 A1* | 2/2002 | Laprise | ............ | G01R 31/31728 385/14 |
| 2004/0146253 A1* | 7/2004 | Wang | .................... | G02B 6/4249 385/93 |
| 2004/0166905 A1* | 8/2004 | Cherniski | ............... | G06F 1/183 455/575.1 |
| 2005/0031352 A1* | 2/2005 | Light | ................. | H04B 10/0799 398/135 |
| 2005/0265717 A1* | 12/2005 | Zhou | ..................... | G01M 11/00 398/9 |
| 2006/0008199 A1* | 1/2006 | Glebov | .................. | G02B 6/322 385/15 |
| 2006/0269283 A1 | 11/2006 | Iwadate | | |
| 2009/0140755 A1* | 6/2009 | Byers | ................... | H04B 10/803 324/763.01 |
| 2014/0093233 A1* | 4/2014 | Gao | ................... | H04B 10/0799 398/16 |

(Continued)

OTHER PUBLICATIONS

Office Action for U.S. Appl. No. 15/820,725 dated Jul. 24, 2018, 7 pages.

*Primary Examiner* — David C Payne
*Assistant Examiner* — Omar S Ismail
(74) *Attorney, Agent, or Firm* — Alston & Bird LLP

(57) ABSTRACT

A system for testing optical transmitters including a testing unit, a sensor board, one or more support rails, and a driver is provided. The testing board includes sockets that each receive a substrate supporting a plurality of optical transmitters, and the sensor board includes optical receivers. The one or more support rails are attached to one of the testing board or the sensor board and are designed to engage the other of the testing board or the sensor board. The one or more support rails are configured to substantially align each of the optical receivers with a corresponding socket. The driver is in electrical communication with the optical transmitters and the one or more optical receivers such that the driver can apply a current input to at least, one of the optical transmitters and monitor a corresponding output parameter.

20 Claims, 13 Drawing Sheets

(56) References Cited

U.S. PATENT DOCUMENTS

2015/0288449 A1* 10/2015 Coffey ................ G02B 6/3897
                                                   398/141
2017/0010432 A1*  1/2017 Xu ..................... G02B 6/4452
2018/0003762 A1   1/2018 Burlak et al.

* cited by examiner

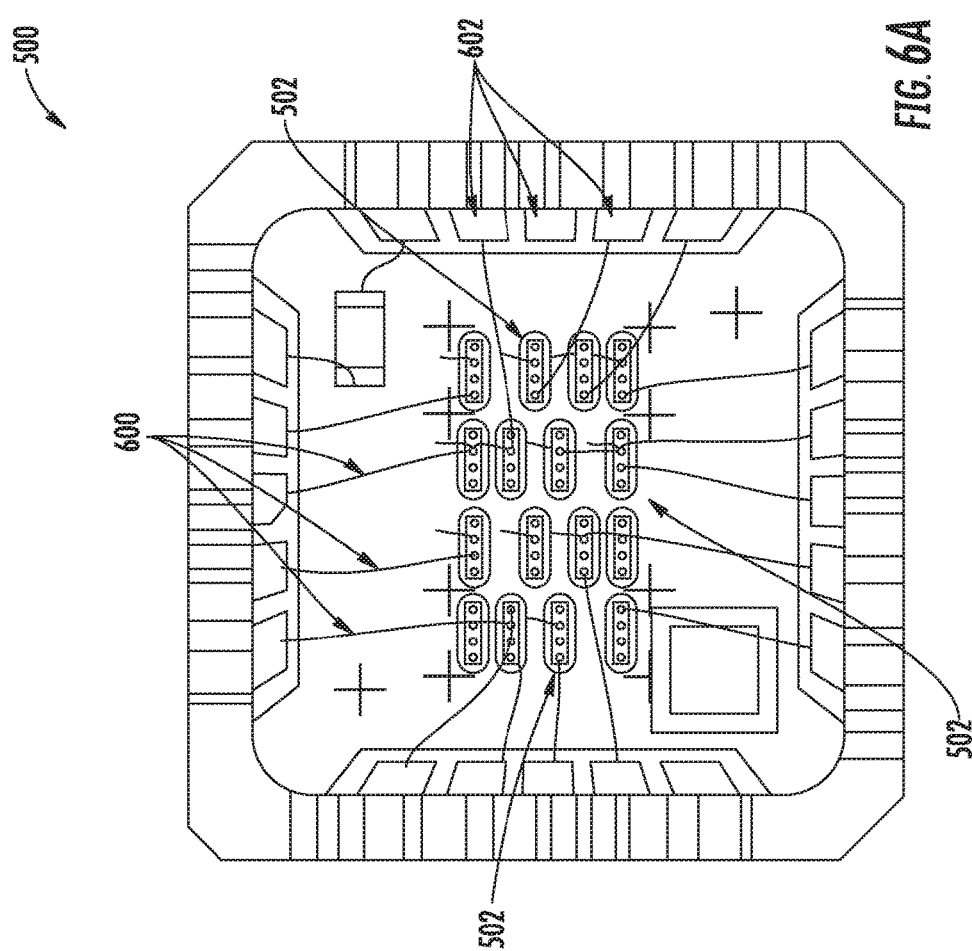

US 10,361,777 B2

SYSTEM FOR TESTING OPTICAL TRANSMITTERS

FIELD OF THE INVENTION

The present disclosure relates generally to optoelectronic devices and, more particularly, to apparatuses, methods, and associated computer program products for predicting failure of optical transmitters such as vertical-cavity surface-emitting lasers (VCSELs).

BACKGROUND OF THE INVENTION

Optoelectronic communication systems, often utilized in data centers, include cables that transmit signals over optical media. These optoelectronic communication systems may utilize active optical cables (AOC) as optical media and may also include separate circuitry that facilitates the transmission of optical signals along the optical cables using one or more transducers or optical transmitters. For example, modern optoelectronic communication systems may utilize vertical-cavity surface-emitting lasers (VCSELs) as optical transmitters that convert electrical signals to optical signals for transmission by an optical cable. One of the primary modes of failure in optical communication systems is the random failure of the optical transmitters.

Applicant has identified a number of additional deficiencies and problems associated with conventional VCSELs and associated testing methods. Through applied effort, ingenuity, and innovation, many of these identified problems have been solved by developing solutions that are included in embodiments of the present invention, many examples of which are described in detail herein.

BRIEF SUMMARY OF THE INVENTION

A system for testing optical transmitters including a testing unit is provided. The testing unit may include a testing board supporting one or more sockets via a top surface of the testing board, and each socket may receive a substrate supporting a plurality of optical transmitters. Each optical transmitter may also convert electrical signals to corresponding optical signals for transmission by the optical transmitter. The testing unit may also include a sensor board supporting one or more optical receivers via a bottom surface of the sensor board where each optical receiver may receive the optical signals transmitted by the plurality of optical transmitters and convert the optical signals to corresponding electrical signals. The testing unit may further include one or more support rails attached to one of the testing board or the sensor board and configured to engage the other of the testing board or the sensor board. The one or more support rails may substantially align each of the one or more optical receivers of the sensor board with a corresponding socket of the testing board such that the plurality of optical transmitters is in optical communication with the one or more optical receivers in an operational mode of the testing unit. The system for testing optical transmitters may also include a driver in electrical communication with the plurality of optical transmitters of the one or more sockets and in electrical communication with the one or more optical receivers of the sensor board. The driver may apply a current input to at least one of the plurality of optical transmitters and may monitor a corresponding output parameter.

In some embodiments, the driver is further may determine a pass state or a fail state of the plurality of optical transmitters based on a comparison of the output parameter to an output parameter threshold.

In some cases, the system for testing optical transmitters may also include a backplane element supporting one or more testing units, and the backplane element may be in electrical communication with the one or more testing units. In such an embodiments, the backplane element may support four testing units.

In a further case, the driver is electrically connected to the backplane element via a rigid-flex printed circuit board. In such an embodiment, the system for testing optical transmitters may further include four drivers that may provide a current to one of the testing units supported by the backplane element.

In other embodiments, the system for testing optical transmitters may further include a control unit in electrical communication with the driver and that may execute a testing method with respect to the plurality of optical transmitters of the testing unit.

In some cases, each testing board may support eight sockets. Each socket may receive a substrate supporting sixteen optical transmitters.

In other embodiments, the plurality of optical transmitters include vertical-cavity surface-emitting lasers, and the one or more optical receivers include photodiodes.

In some embodiments, the distance between the socket and the sensor board is less than 9.33 mm.

In some still further embodiments, the sensor board includes a male connector configured to be received by a corresponding female connector defined by the testing board.

In other cases, the testing unit defines a connecting portion having a first width and an edge connector and defines a testing portion having a second width, where the second width is larger than the first width. In such a case, the edge connector may be configured to be received by a corresponding connector of a backplane element. Still further, the driver may also be in electrical communication with the backplane element via a rigid-flex printed circuit board, and the backplane element may be in electrical communication with the testing unit via the edge connector such that the current input applied by the driver is received by the plurality of optical transmitters via the backplane element.

A method of manufacturing a system for testing optical transmitters is provided. The method may include providing a testing unit. The testing unit may include a testing board supporting one or more sockets via a top surface of the testing board, and each socket may receive a substrate supporting a plurality of optical transmitters. Each optical transmitter may also convert electrical signals to corresponding optical signals for transmission by the optical transmitter. The testing unit may also include a sensor board supporting one or more optical receivers via a bottom surface of the sensor board where each optical receiver may receive the optical signals transmitted by the plurality of optical transmitters and convert the optical signals to corresponding electrical signals. The testing unit may further include one or more support rails attached to one of the testing board or the sensor board and configured to engage the other of the testing board or the sensor board. The one or more support rails may substantially align each of the one or more optical receivers of the sensor board with a corresponding socket of the testing board such that the plurality of optical transmitters is in optical communication with the one or more optical receivers in an operational mode of the testing unit. The method may also include providing a driver. The driver may be electrical communication with the plurality of optical transmitters of the one or more sockets and in electrical communication with the one or more optical receivers of the sensor board. The driver may apply a current input to at least one of the plurality of optical transmitters and may monitor a corresponding output parameter.

In some embodiments, the method may also include providing a backplane element supporting one or more testing units.

In other embodiments, the method may also include providing one or more drivers, where each driver provides a current to one of the testing units supported by the backplane element.

In some other embodiments, the method may also include providing a control unit in electrical communication with the driver and may execute a testing method with respect to the plurality of optical transmitters of the testing unit.

BRIEF DESCRIPTION OF THE SEVERAL VIEWS OF THE DRAWINGS

Figure 1:
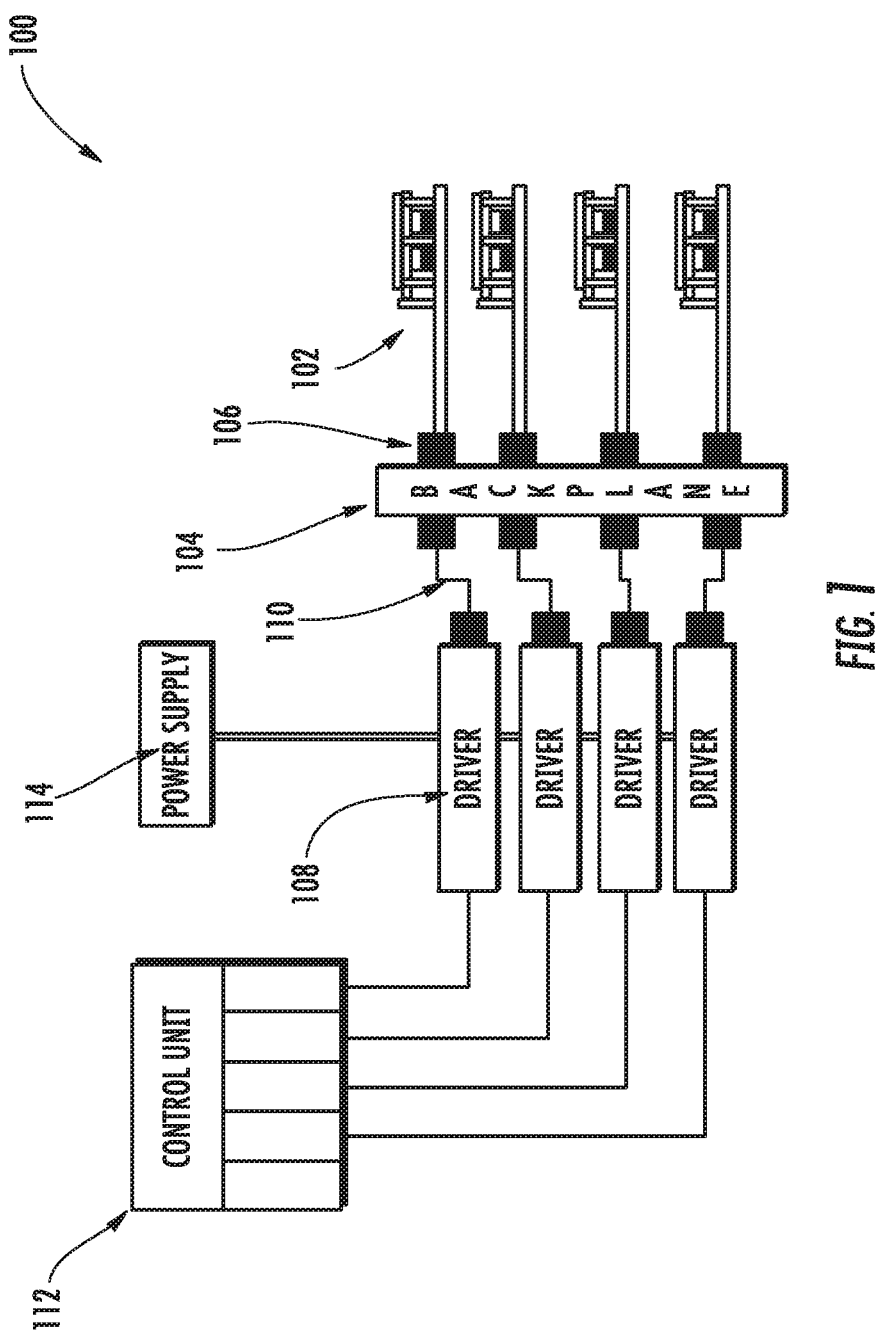
Figure 2:
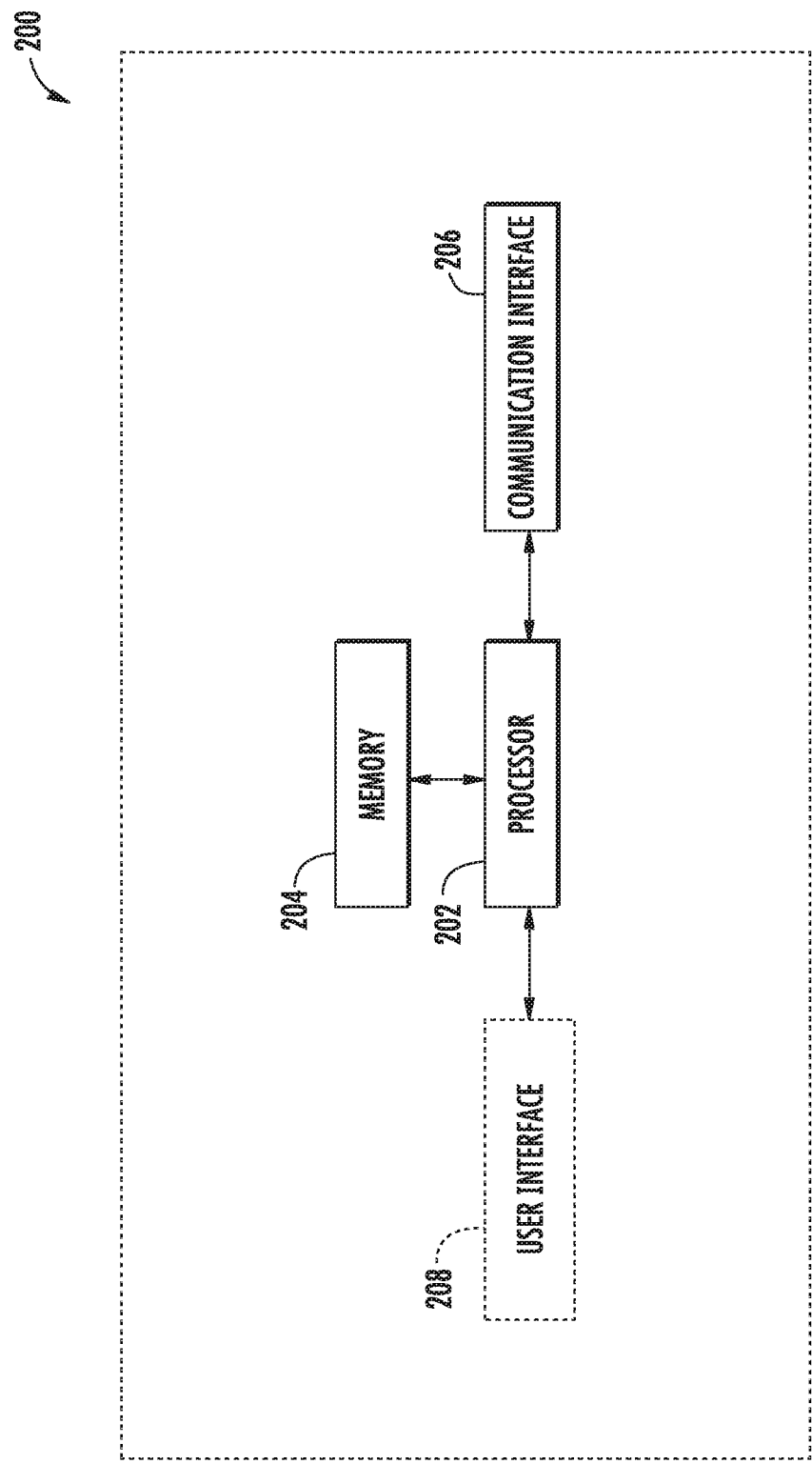
Figure 3:
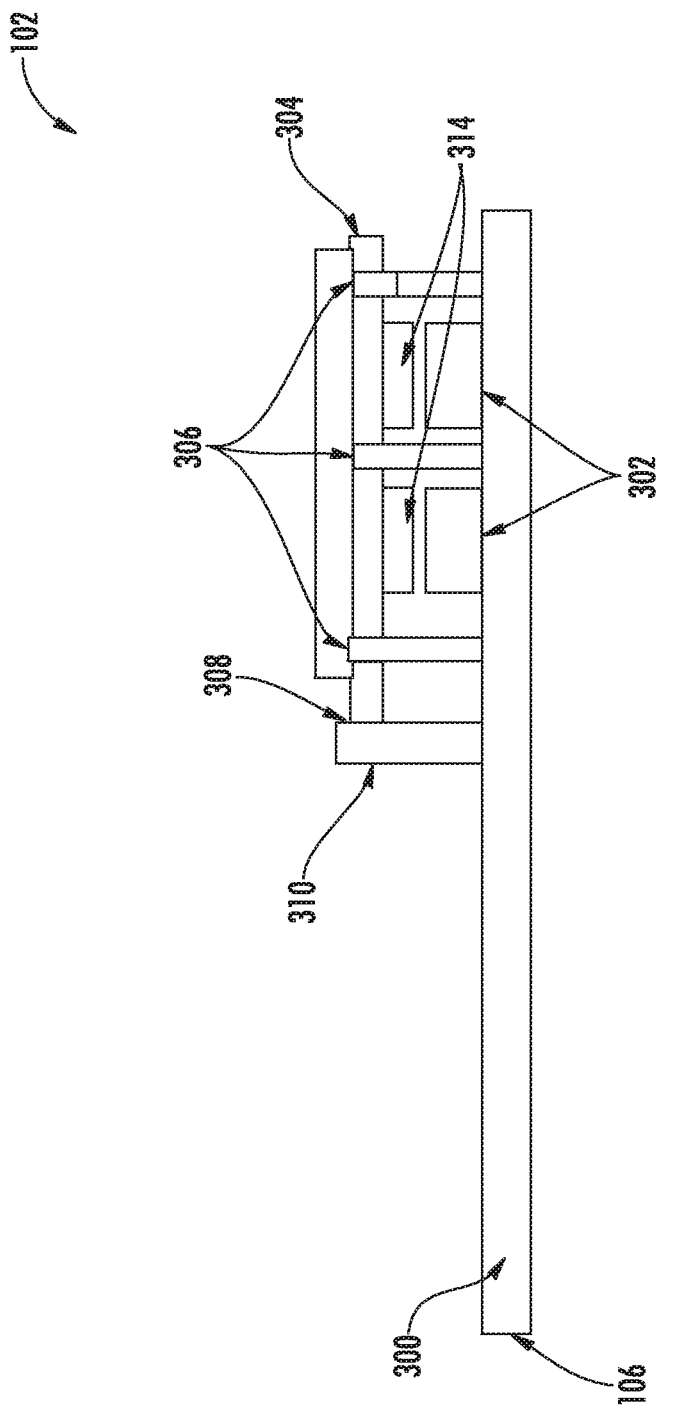
Figure 4:
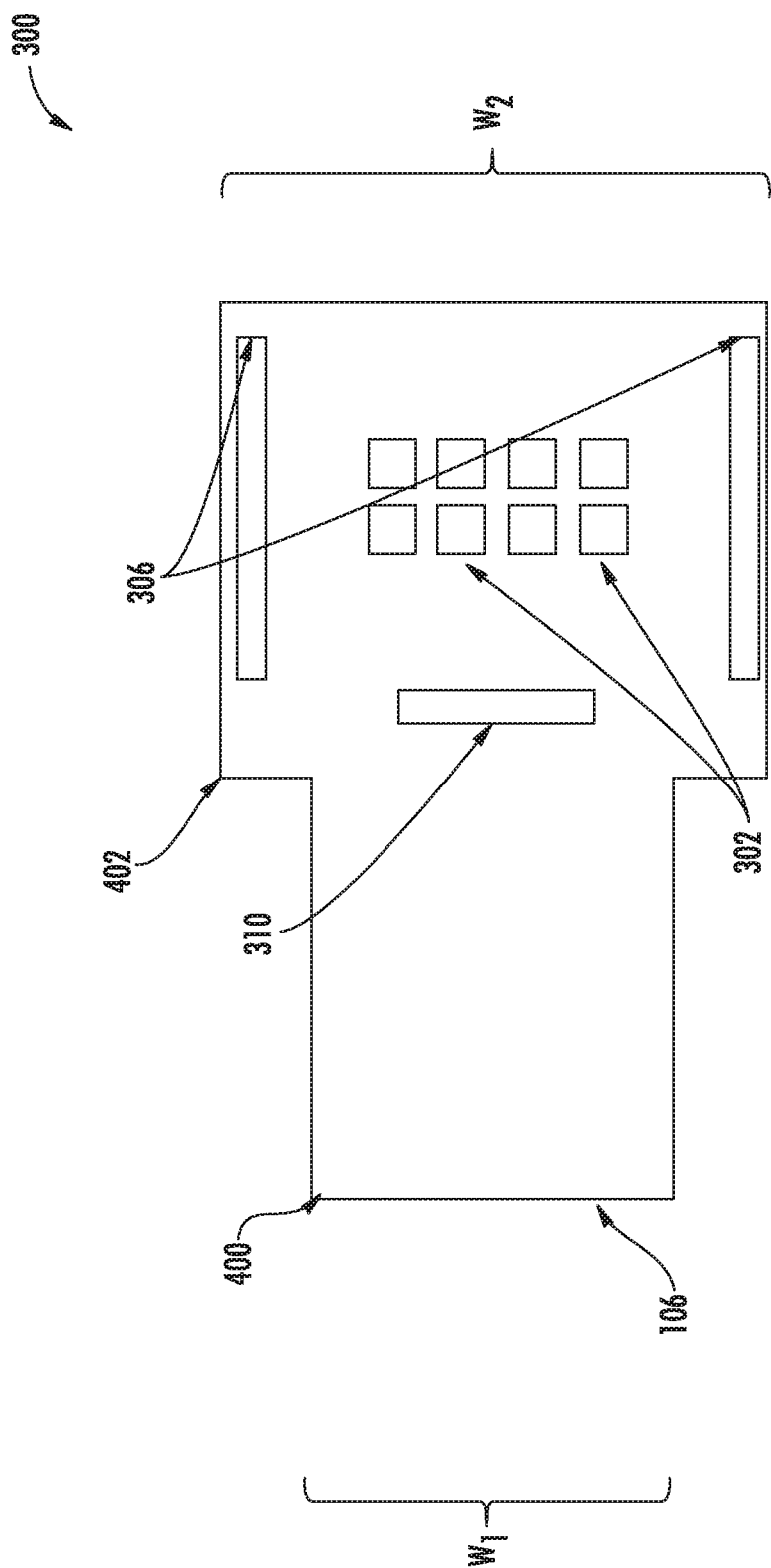
Figure 5:
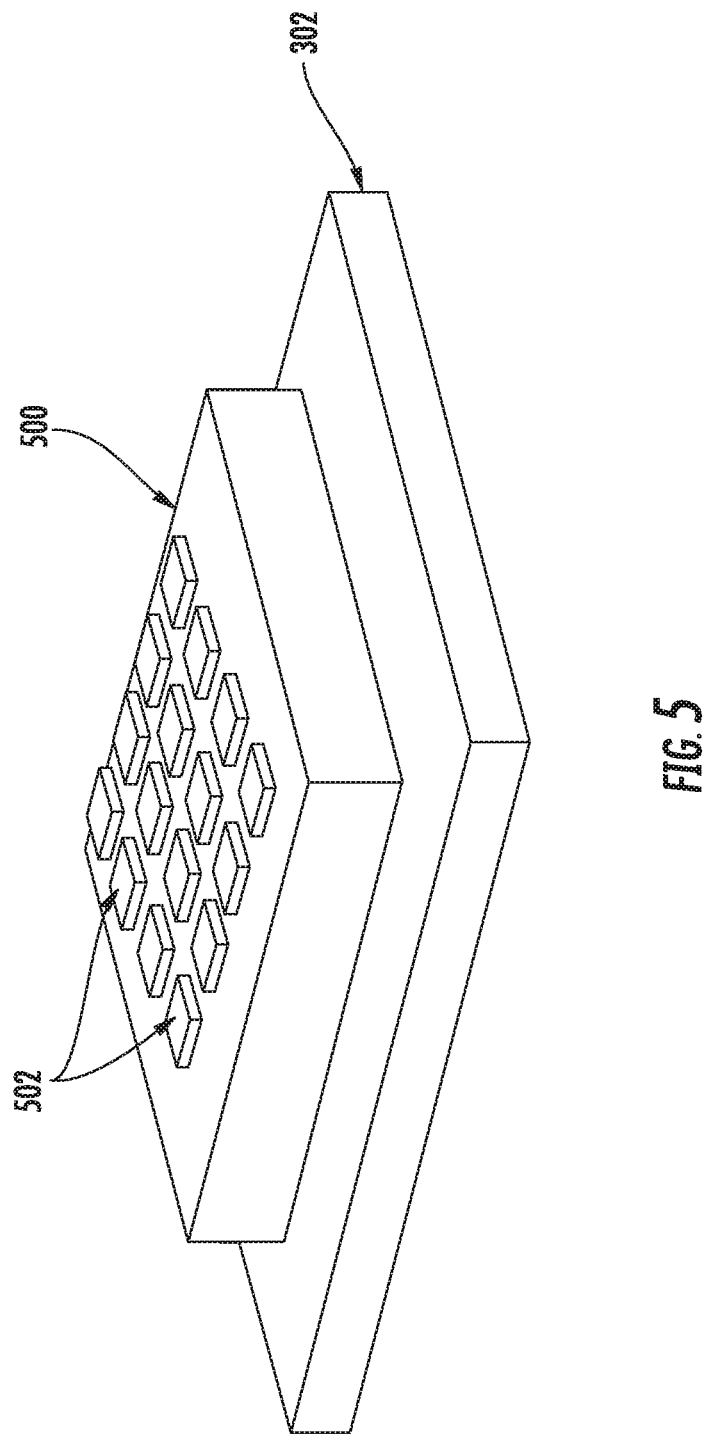
Figure 6:
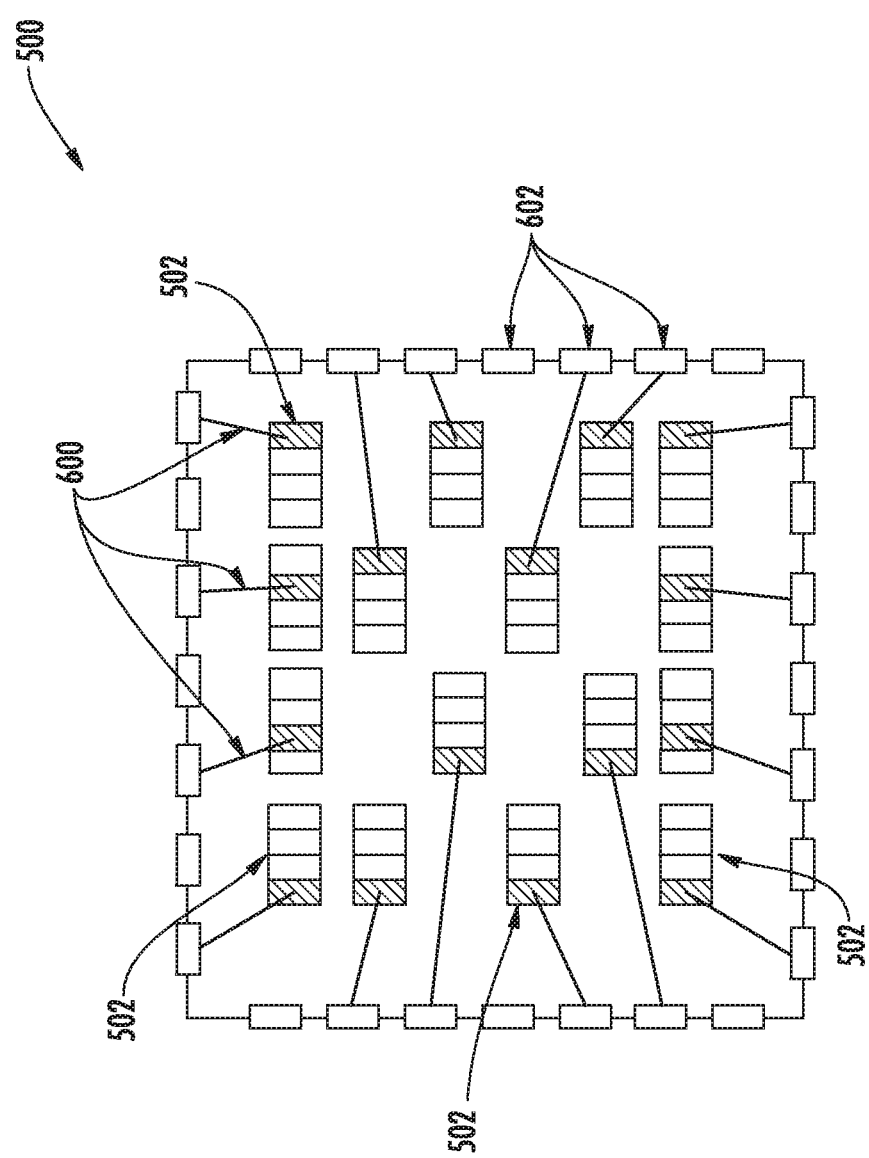
Figure 7:
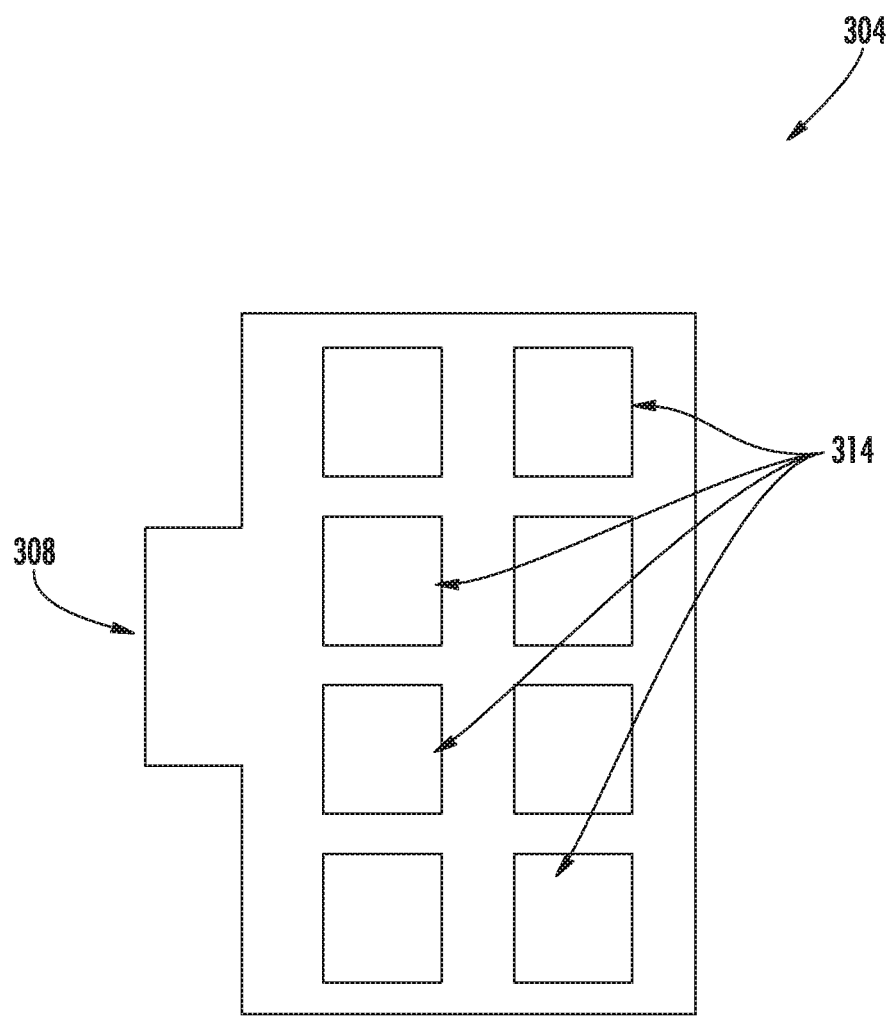
Figure 8:
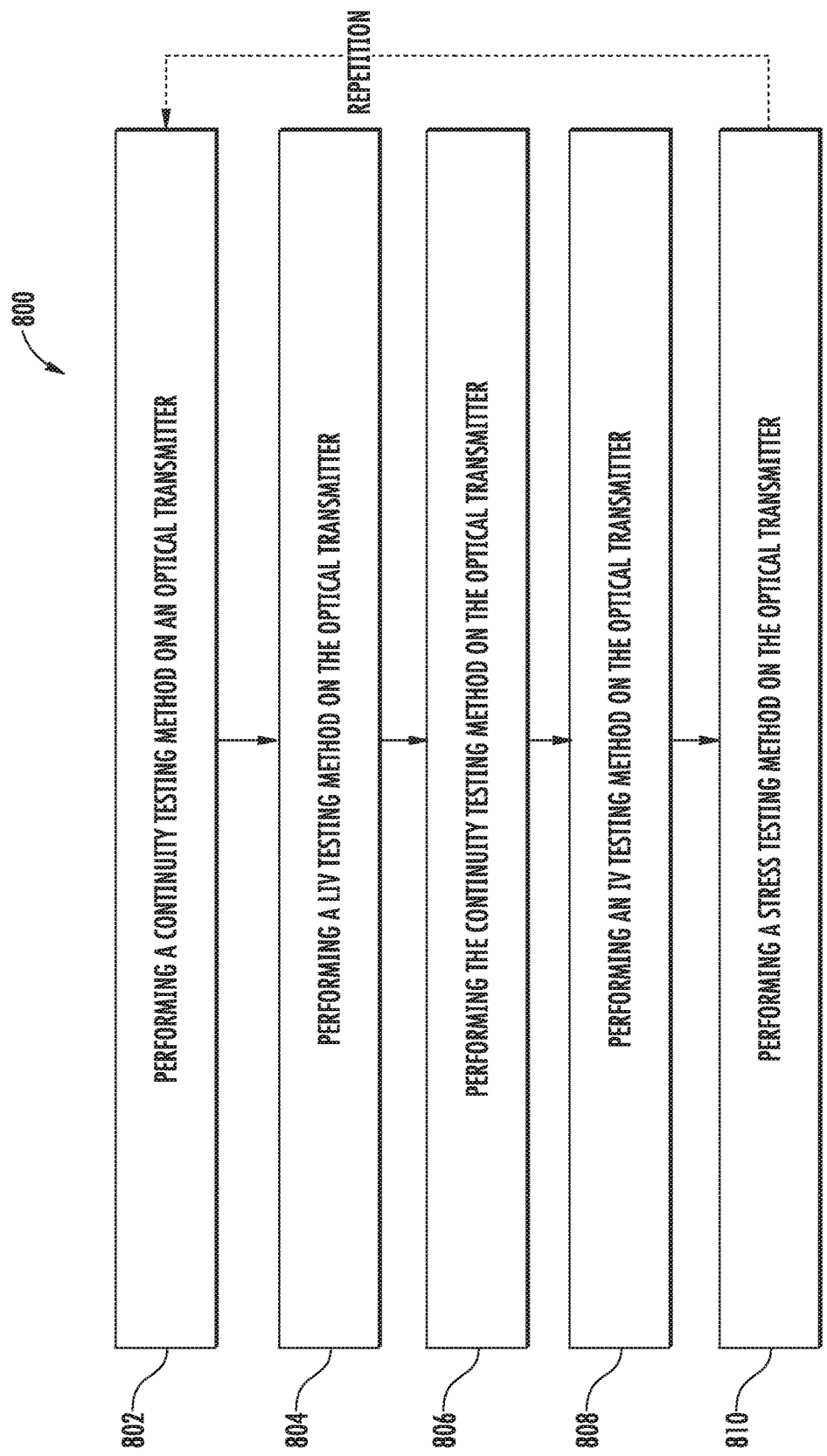
Figure 9:
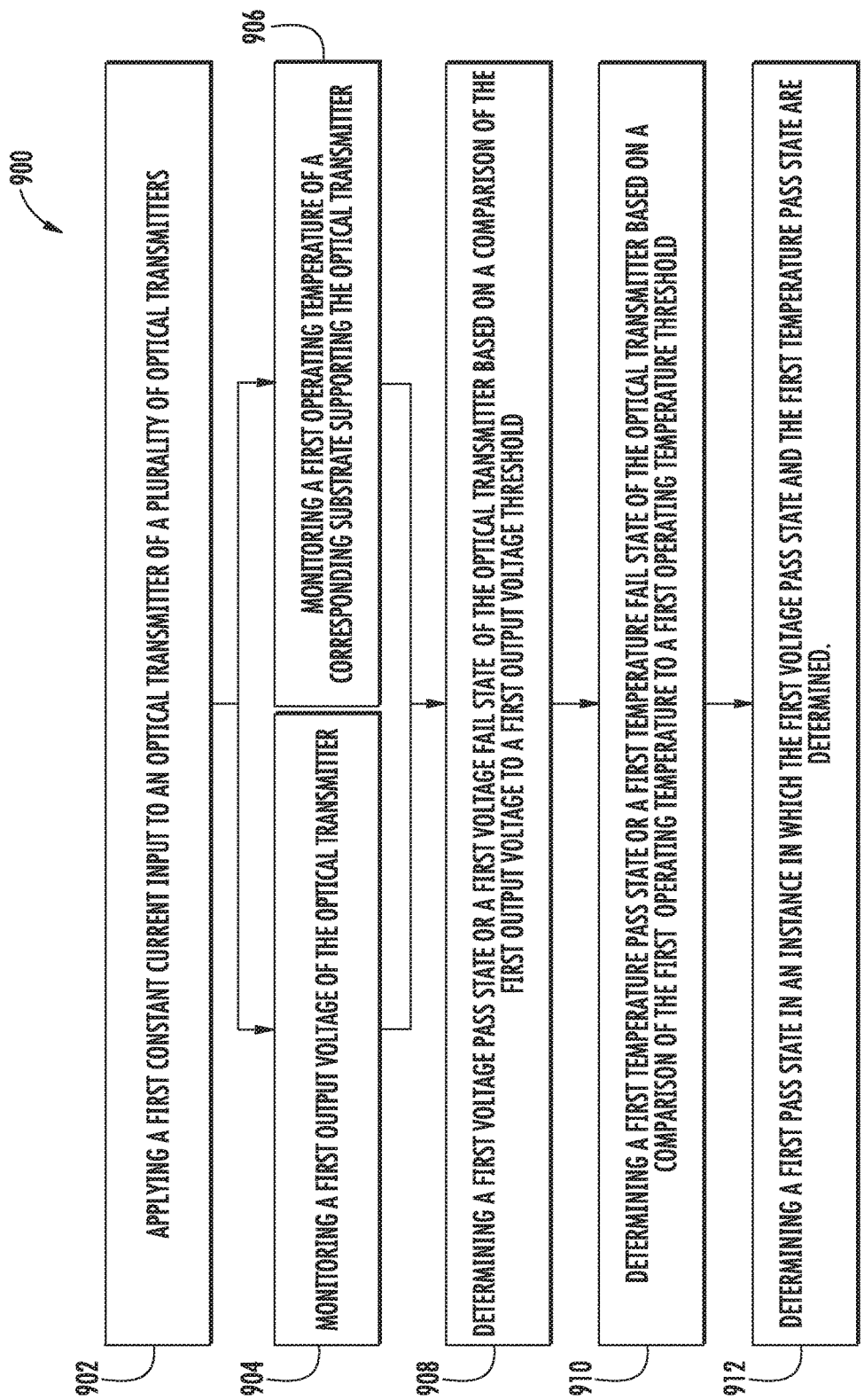
Figure 10:
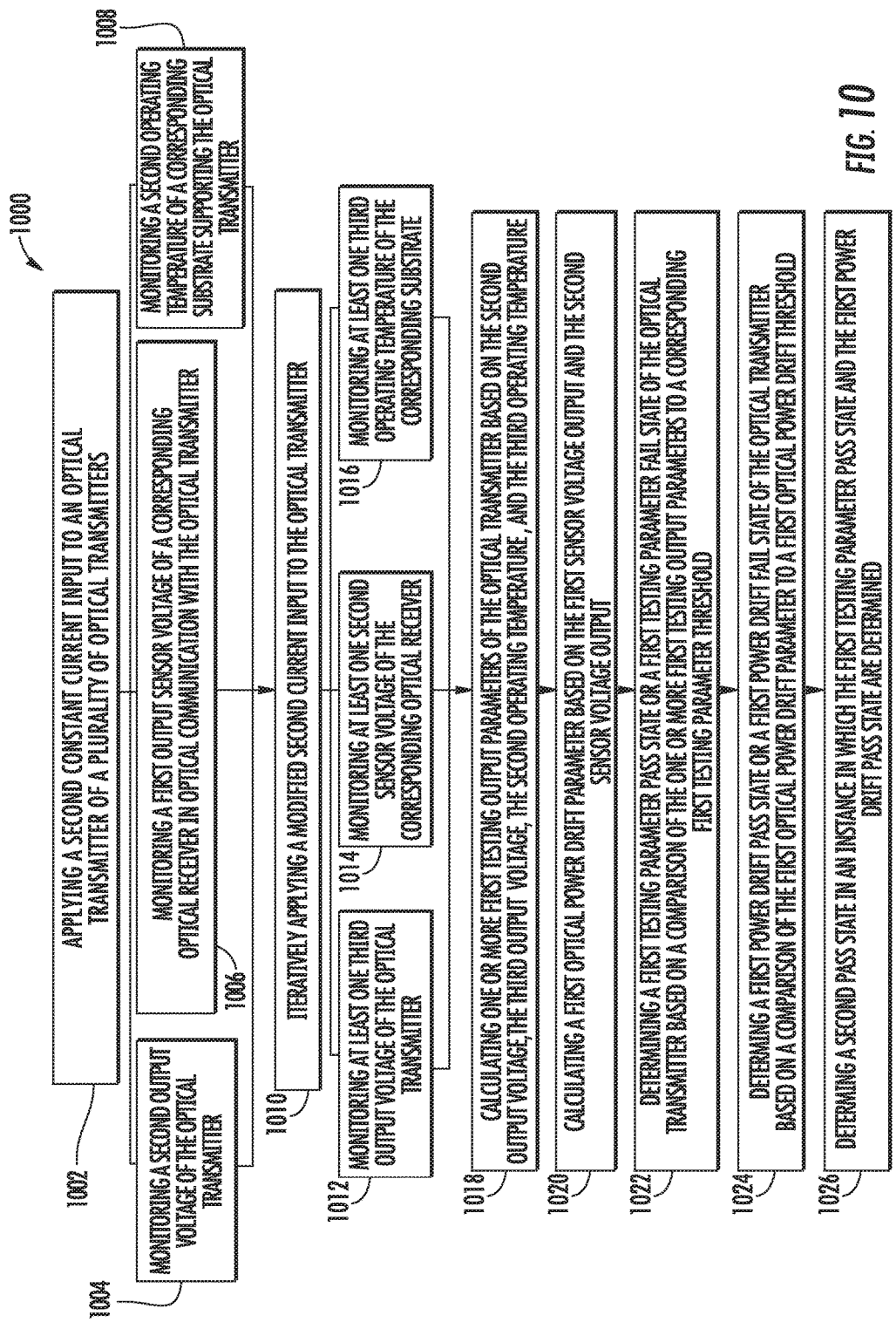
Figure 11:
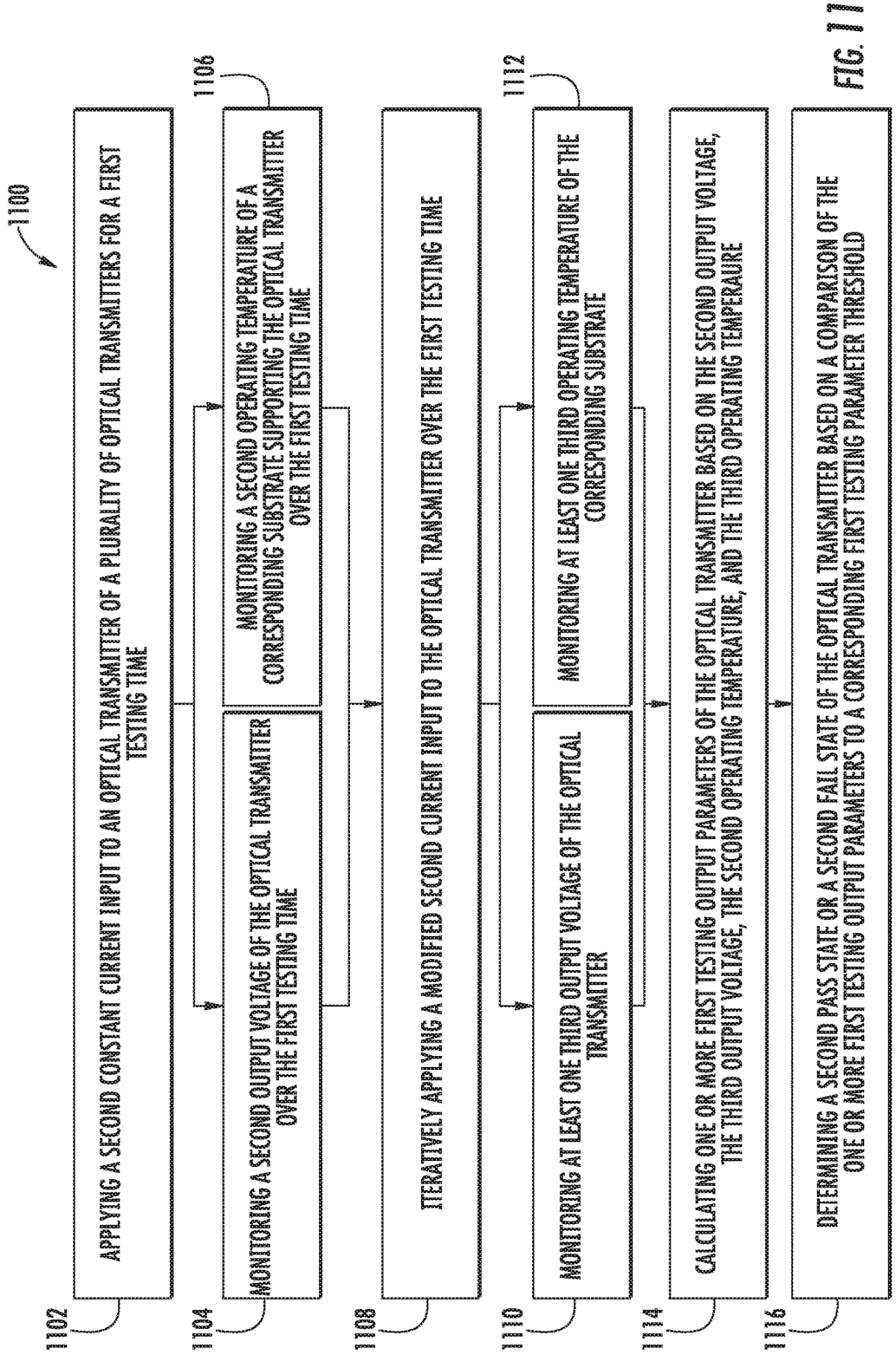
Figure 12:
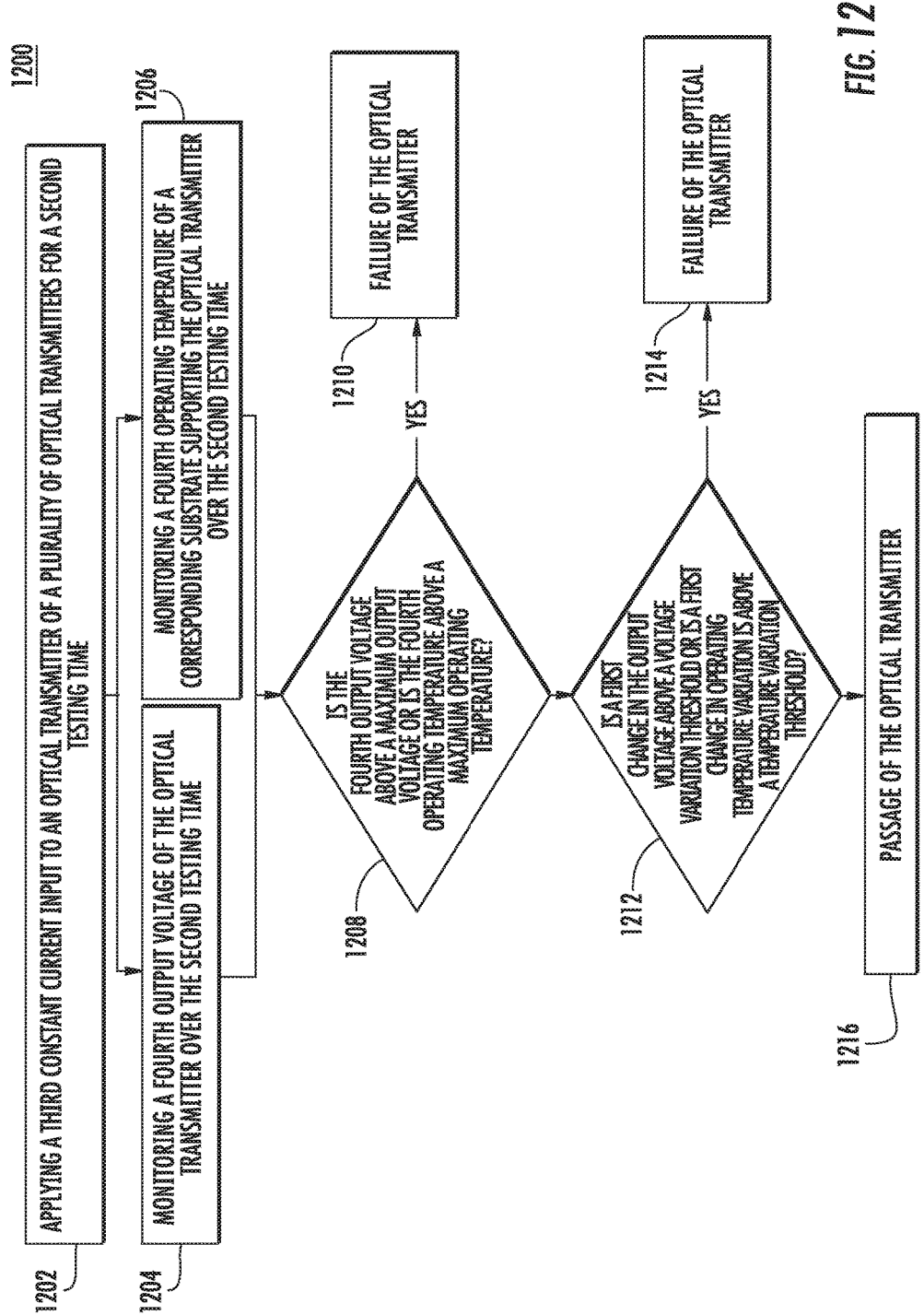

Having thus described the invention in general terms, reference will now be made to the accompanying drawings, which are not necessarily drawn to scale, and wherein:

FIG. 1 shows a diagram of a system for testing optical transmitters in accordance with some embodiments discussed herein;

FIG. 2 shows a block diagram of an example apparatus that may be specifically configured in accordance with some embodiments discussed herein FIG. 3 shows a side view of a testing unit in accordance with some embodiments discussed herein;

FIG. 4 shows a top view of a testing board of FIG. 2 in accordance with some embodiments discussed herein;

FIG. 5 shows a perspective view of a socket, substrate, and plurality of optical transmitters in accordance with some embodiments discussed herein;

FIG. 6 shows a top view of a substrate of FIG. 4 in accordance with some embodiments discussed herein;

FIG. 6A shows a top view of a particular configuration of the substrate of FIG. 4 in accordance with some embodiments discussed herein;

FIG. 7 shows a bottom view of a sensor board of FIG. 2 in accordance with some embodiments discussed herein;

FIG. 8 shows a flow chart illustrating an optical transmitter testing method in accordance with some embodiments discussed herein;

FIG. 9 shows a flow chart illustrating a continuity testing method of an optical transmitter in accordance with some embodiments discussed herein;

FIG. 10 shows a flow chart illustrating an LIV testing method of an optical transmitter in accordance with some embodiments discussed herein;

FIG. 11 shows a flow chart illustrating an IV testing method of an optical transmitter in accordance with some embodiments discussed herein; and FIG. 12 shows a flow chart illustrating a stress testing method of an optical transmitter in accordance with some embodiments discussed herein.

DETAILED DESCRIPTION

Overview

The present invention now will be described more fully hereinafter with reference to the accompanying drawings in which some but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout. As used herein, terms such as "front," "rear," "bottom," "top," etc. are used for explanatory purposes in the examples provided below to describe the relative position of certain components or portions of components. As used herein, the term "module" encompasses hardware, software, and/or firmware configured to perform one or more particular functions, including but not limited to conversion between electrical and optical signals and transmission of the same. As would be evident to one of ordinary skill in the art in light of the present disclosure, terms such as "about" and "substantially" indicate that the referenced element or associated description is accurate to within applicable engineering tolerances. Additionally, as discussed herein, an example embodiment is described with reference to a vertical-cavity surface-emitting laser (VCSEL) and photodiode as the optical transmitter and optical receiver, respectively; however, embodiments of the present invention may be equally applicable for use with any transceiver system and/or element.

Optical cables are comprised of optical fibers that may be utilized in conjunction with optical transmitters and receivers built into transceiver modules and systems located at the ends of the optical cables for transmitting and receiving optical signals. The transceiver modules may include Small Form-Factor Pluggable (SFP), Dual SFP, Quad Small Formfactor Pluggable (QSFP), C-Form-Factor Pluggable (CFP), or any transceiver known or used in optical communication. The transceiver modules or systems may plug into suitable electrical communication ports, such as Gigabit Ethernet or InfiniBand® ports, of switching and computing equipment. Optoelectronic components in the transceiver modules and systems may convert the high-speed electrical signals output by the ports into optical signals for transmission over optical fibers (e.g., via a VCSEL). In addition, the optoelectronic components on opposing ends of the optical fibers may receive the optical signals and convert the optical signals into high-speed electrical signals for input to the electrical communication ports and modules (e.g., via a photodiode).

In many transceiver modules and systems, optical transmitters, such as VCSELs, are used to generate optical signals for transmission over optical fibers. VCSELs in particular are favored for their high bandwidth and efficiency. In some implementations, an array of such VCSELs is used to drive a corresponding array of optical fibers, which are joined together in a ribbon configuration. Optical fibers may be connected to both VCSELs and photodiode configurations on opposing ends such that one or more photodiodes may receive the optical signals from the VCSELs at a receiving end of the fibers and convert the optical signals into electrical signals.

In manufacturing transceiver modules and systems, optical transmitters, such as VCSELs, are often subjected to various testing procedures in order to determine the anticipated reliability of the components found in the transceiver modules and systems. These testing procedures may be conducted prior to installation of the component in an operational system. Conventional tests may only subject a limited number of VCSELs to an elevated temperature or current input for a period of time to, based upon the observed results, determine the expected reliability of the VCSEL once it is installed in an optical communication system. Conventional testing procedures, however, may fail to accurately identify VCSELs that have a high likelihood of failure or are prone to certain modes of failure (e.g., random failures). For example, conventional testing procedures often use broad tolerances, such that VCSELs exhibiting characteristics associated with the random failure of the VCSEL are deemed to pass the testing procedure and are provided to users for installation, putting the systems at risk of premature failure in operation.

Traditionally, failure in these transmitters (e.g., the VCSELs) requires an entire optoelectronic transducer or associated optical assembly to be deconstructed or replaced. Given the abundant use of optical transmitters in a single datacenter rack, such a deconstruction or replacement process incurs substantial cost in terms of down time, labor, and other costs to the user. Furthermore, conventional testing apparatuses, methods, and computer program products used to predict the failure of optoelectronic devices only allow for testing to be performed on a small number of devices during a single testing method. These limitations result in wide variability between tested components and increased time-to-market for the resultant optical transmitters and associated transceiver systems.

Additionally, these conventional testing methods, such those used with TO-can laser diode mounts ("TO-can"), may only test a limited number of optical transmitters in any single testing procedure. The limited sample size for each testing procedure can result in increased variability among VCSELs tested in different iterations of a particular testing method. Additionally, in conventional testing procedures with TO-cans, testing parameters such as ambient temperature that are relevant to the resultant reliability of the tested VCSELs may vary widely between each TO-can. Said another way, conventional systems may fail to provide consistent testing parameters across a large number of VCSELs.

Embodiments of the present invention that are described herein provide an improved system and method for testing the reliability and accurately predicting the failure of a VCSEL prior to installation of the VCSEL in an operational optical communication system. For the sake of clarity and convenience of description, the embodiments that are described below refer to a particular configuration, using VCSELs as optical transmitters. The principles of the present invention, however, may similarly be implemented using other types of emitters (e.g., other types of lasers), modulators, and switching elements, as well as other optoelectronic transceiver components (e.g., photodiodes and differently configured optical cables and connector modules).

System Hardware

With reference to FIG. 1, a system for testing optical transmitters 100 is illustrated including a testing unit 102, a backplane element 104, a driver 108, a control unit 112, and a power supply 114. As described hereinafter with reference to FIGS. 2-6A, the testing unit 102 may include or otherwise support various optoelectronic components, such as optical transmitters and optical receivers, so that one or more testing procedures may be performed on the optoelectronic components supported thereon. As shown, in some embodiments, the testing unit 102 may be supported by a backplane element 104 such that the backplane element 104 is in electrical communication with the testing unit 102. To establish and maintain electrical communication, in some embodiments, the testing unit may include an edge connector 106 configured to be received by a corresponding connector of the backplane element 104. The connection between the backplane element 104 and the testing unit 102 may be such that electrical signals may flow therebetween.

Additionally, and as shown in FIG. 1, the backplane element 104 may also be configured to support one or more testing units 102 where each testing unit may define a corresponding edge connector 106 in order to electrically connect with the backplane element 104. While reference hereinafter may be made to one testing unit 102 and/or one corresponding backplane element 104, the present disclosure contemplates that any number of testing units 102 may be supported by a backplane element 104 and/or that the system 100 may include any number of additional backplane elements 104. Furthermore, in some embodiments, the system 100 may not include a backplane element 104 such that the testing unit may be directly connected to a driver 108 or a control unit 112. Said another way, the present disclosure contemplates that any number of structural support elements (e.g., datacenter racks, cabinets, testing chambers, or the like) may function to support the testing unit 102 and/or may facilitate electrical connection between the testing unit 102 and an electrical or current input device (e.g., the driver 108).

With continued reference to FIG. 1, the system 100 may also include a driver 108 configured to generate inputs (e.g., a current input) that may be applied to optoelectronic components (e.g., VCSELs) supported by the testing unit 102. For example, the driver 108 may be configured to generate and apply a stress current or voltage to the testing unit 102 supported by the backplane 104. As described herein, the driver 108 may also be in electrical communication with a plurality of optical transmitters (e.g., a plurality of optical transmitters 502 in FIG. 5) of one or more sockets (e.g., one or more sockets 302 in FIG. 3) and in electrical communication with the one or more optical receivers (e.g., one or more optical receivers 314 in FIG. 3) of the sensor board (e.g., a sensor board 304 in FIG. 3). The driver 108 may also be configured to apply a current input to at least one optical transmitter and to monitor a corresponding output parameter (e.g., output voltage, operating temperature, etc.). Further, the driver 108 may receive electrical signals output by the testing unit 102 that may be directed to a control unit 112 described hereinafter. Furthermore, the driver 108 may include circuitry and/or optoelectronic elements (e.g., a multiplexer) configured to multiplex outputs signals received by the driver 108 from the testing unit 102 into a signal combined signal for transmission over a shared transmission medium (e.g., an optical fiber or the like) to a control unit 112 or other device in electrical communication with the driver 108. In some embodiments, the driver 108 may be further configured to determine a pass state or a fail state of any number of a plurality of optical transmitters based on a comparison of various output parameters to corresponding output parameter thresholds.

As shown in FIG. 1, in some embodiments, the driver 108 may be in electrical communication with the backplane element 104 via a rigid-flex printed circuit board ("PCB"). Additionally, in some embodiments, the system 100 may include one or more drivers 108 configured to provide inputs to one or more testing units 102. By way of example, in some embodiments, the number of drivers 102 used by the system 100 may correspond to the number of testing units 102 used by the system such that each driver 108 provides an input to a corresponding testing unit 102. By way of a more particular example as shown in FIG. 1, in some embodiments, the system 100 may include four (4) drivers 108 each in electrical communication with a backplane element 104 and a corresponding testing unit 102. While illustrated with the driver 108 providing inputs to only one corresponding testing unit 102, the present disclosure contemplates that any number of drivers may provide inputs to any number of testing units 102. Said another way, one driver 108 may provide inputs to multiple testing units 102 and/or multiple drivers 108 may provide inputs to a single corresponding testing unit 102.

In some embodiments, the system 100 may also include a control unit 112 configured to execute or otherwise control the operation of the testing methods and procedures applied to the optoelectronic components supported by the testing unit 102. In some embodiments, the control unit 112 may be in electrical communication with the driver 108 such that electrical signals may be provided to the driver 108 (e.g., current inputs) and electrical signals may be provided from the driver 108 to the control unit 112 (e.g., output parameters, multiplex signals, or the like). As would be understood by one or ordinary skill in the art in light of the present disclosure, with reference in particular to the description of FIG. 3 below, the control unit 112 may operate as a computer or computer program product. In particular, the control unit 112 may be configured to execute one or more testing methods (e.g., measurements, algorithms, protocols, or the like) by directing or otherwise controlling operation of the driver 108. Thus, the control unit 112 may provide commands to the driver 108 to apply various inputs (e.g., currents) to the testing unit 102 and may receive output data (e.g., electrical signals) from the testing unit 102 via the driver 108.

Furthermore, the control unit 112 may be configured to monitor or control various other variables or parameters of the system 100. For example, the control unit 112 may be in electrical communication with one or more sensors (e.g., thermometers, pressure sensors, humidity sensors, accelerometers, photo resistors, barometers, and the like) so as to monitor input, output, and/or ambient conditions of the system 100. For example, the control unit 112 may monitor the ambient temperature of the system 100 and/or the output temperature of one or more optoelectronic components (e.g., when subjected to a current input) via electrical communication with one or more thermometers. Although described herein with respect to the control unit 112 executing testing methods or procedures via input commands to the driver 108, the present disclosure contemplates that the driver 108 may also include some or all of the circuitry or operation of the control unit 112. Said another way, the driver 108 may be integral to the control unit 112 in physical structure and/or operation. Similar to the backplane element 104 and the driver 108 above, in some embodiments, the system 100 may comprise one or more control units 112 configured to direct the operation of one or more drivers 108. In any embodiment described herein, the system 100 may include one or more power supplies 114 configured to provide power to one or more of the control unit 112 and/or the driver 108.

Regardless of the type of device that embodies the control unit 112 or the driver 108, the control unit 112 and/or driver 108 may include or be associated with an apparatus 200 as shown in FIG. 2. In this regard, the apparatus 200 may include or otherwise be in communication with a processor 202, a memory device 204, a communication interface 206, and/or a user interface 208. As such, in some embodiments, although devices or elements are shown as being in communication with each other, hereinafter such devices or elements should be considered to be capable of being embodied within the same device or element and thus, devices or elements shown in communication should be understood to alternatively be portions of the same device or element.

In some embodiments, the processor 202 (and/or co-processors or any other processing circuitry assisting or otherwise associated with the processor) may be in communication with the memory device 204 via a bus for passing information among components of the apparatus 200. The memory device 204 may include, for example, one or more volatile and/or non-volatile memories. In other words, for example, the memory device 204 may be an electronic storage device (e.g., a computer readable storage medium) comprising gates configured to store data (e.g., bits) that may be retrievable by a machine (e.g., a computing device like the processor). The memory device 204 may be configured to store information, data, content, applications, instructions, or the like for enabling the apparatus 200 to carry out various functions in accordance with an example embodiment of the present invention. In this regard, the memory device 204 may store various testing procedures, testing parameters, and/or threshold values configured to evaluate the reliability of a VCSEL as discussed below with reference to FIGS. 8-12. For example, the memory device 204 could be configured to buffer input data for processing by the processor 202. Additionally or alternatively, the memory device 204 could be configured to store instructions for execution by the processor 202.

As noted above, the apparatus 200 may be embodied by the driver 108 or the control unit 112 configured to be utilized in an example embodiment of the present invention. However, in some embodiments, the apparatus 200 may be embodied as a chip or chip set. In other words, the apparatus 200 may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon.

The processor 202 may be embodied in a number of different ways. For example, the processor 202 may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like.

In an example embodiment, the processor 202 may be configured to execute instructions stored in the memory device 204 or otherwise accessible to the processor 202. Alternatively or additionally, the processor 202 may be configured to execute hard coded functionality. As such, whether configured by hardware or software methods, or by a combination thereof, the processor 202 may represent an entity (e.g., physically embodied in circuitry) capable of performing operations according to an embodiment of the present invention while configured accordingly. Thus, for example, when the processor 202 is embodied as an ASIC, FPGA or the like, the processor 202 may be specifically configured hardware for conducting the operations described herein. Alternatively, as another example, when the processor 202 is embodied as an executor of software instructions, the instructions may specifically configure the processor 202 to perform the algorithms and/or methods described herein when the instructions are executed. However, in some cases, the processor 202 may be a processor 202 of a specific device (e.g., a control unit 112 or driver 108 as shown in FIG. 1) configured to be employed by an embodiment of the present invention by further configuration of the processor 202 by instructions for performing the algorithms and/or operations described herein.

Meanwhile, the communication interface 206 may be any means such as a device or circuitry embodied in either hardware or a combination of hardware and software that is configured to receive and/or transmit data between computing devices and/or servers. For example, the communication interface 206 may be configured to communicate wirelessly with the one or more drivers 108 and/or testing units 102, such as via Wi-Fi, Bluetooth, or other wireless communications techniques. In some instances, the communication interface may alternatively or also support wired communication. For example, the communication interface 206 may be configured to communicate via wired communication with other components of the drive 108 and/or testing unit 102.

In some embodiments, the apparatus 200 may optionally include a user interface 208 in communication with the processor 202, such as by the user interface circuitry, to receive an indication of a user input and/or to provide an audible, visual, mechanical, or other output to a user. As such, the user interface 208 may include, for example, a keyboard, a mouse, a display, a touch screen display, a microphone, a speaker, and/or other input/output mechanisms. The user interface may also be in communication with the memory 204 and/or the communication interface 206, such as via a bus.

With reference to FIG. 3, a testing unit 102 of the system 100 is illustrated. As shown, the testing unit 102 may include a testing board 300, a sensor board 304, one or more support rails 306, and an edge connector 106. As shown, in some embodiments, the testing board 300 may be configured to support one or more sockets 302 via a top surface of the testing board 300. As described hereinafter with reference to FIGS. 4-6A, the one or more sockets 302 may receive a substrate supporting one or more optical transmitters for transmitting optical signals (e.g., a substrate 500 and an optical transmitter 502 in FIG. 5). The testing board 300 of the testing unit 102 may include a substrate, circuit board, or any other support structure which allows electrical signals to be directed to the socket 302, and subsequently to the optical transmitters supported thereon, from the driver 108 via the backplane 104 (in FIG. 1). In particular, the testing board may define one or more electrical traces, connections, or the like configured to allow electrical communication between the plurality of optical transmitters (e.g., optical transmitters 502 in FIG. 5) and the driver 108 (see FIG. 1). As described above with reference to FIG. 1, the testing board 300 (e.g., of the testing unit 102) may define an edge connector 106 configured to be received by a corresponding connector of the backplane element 104. The connection between the backplane element 104 and the testing unit 102 may be such that electrical signals may flow therebetween.

The testing unit 102 may also include a sensor board 304 supporting one or more optical receivers 314 (e.g., photodiodes) via a bottom surface of the sensor board 304. As described more fully hereinafter, the one or more optical receivers may be configured to receive optical signals transmitted by a plurality of optical transmitters and may be configured to convert the optical signals to corresponding electrical signals. As shown in FIG. 3, the one or more optical receivers 314 may be in optical communication via alignment of the testing board 300 with the sensor board 304. For example, the testing unit 102 may be configured such that the top surface of the testing board 300 supporting the one or more sockets 302 is disposed opposite the bottom surface of the sensor board 300 supporting the one or more optical receivers 314. The testing unit 102 may further include one or more support rails 306 attached to one of the testing board 300 or the sensor board 304, and the one or more support rails 306 may be configured to attach the testing board 300 to the sensor board 304. While illustrated with three (3) support rails 306 in FIG. 3, the present disclosure contemplates that any number of support rails may be used in any configuration. Additionally, the support rails 306 may be attached to either one of the sensor board 304 or testing board 300 so long as the one or more support rails 306 may be configured to substantially align each of the one or more optical receivers 304 of the sensor board with a corresponding socket 302 of the testing board 300 such that optical signals transmitted by an optical transmitter (e.g., an optical transmitter 502 in FIG. 5) may be received by the corresponding optical receiver 314 of the sensor board 304 when the testing unit 102 is in an operational configuration. Still further, the sensor board 304 may also be disposed substantially parallel with respect to the testing board 300 via the support rails 306 and located such that the distance between the sensor board 304 and the socket 302 of the testing board 300 is less than 9.33 mm.

In some embodiments, and as shown in FIG. 3, the testing board 300 may include a female connector 310 configured to receive a corresponding male connector 308 defined by the sensor board 304. The connection between the female connector 310 and the corresponding male connector 308 may facilitate securing and aligning the sensor board 304 with respect to the testing board 300 such that optical communication between the one or more optical receivers 314 and the plurality of optical transmitters 502 (e.g., shown in FIG. 5) received by the socket 302 are maintained. As would be understood by one or ordinary skill in the art in light of the present disclosure, each of the testing board 300 or the sensor board 304 may define any attachment mechanism (e.g., snaps, grooves, or the like) in order to secure the sensor board 304 to the testing board 300.

With reference to FIG. 4, a top view of the testing board 300 configured to support eight (8) optical transmitters (not shown) via eight (8) sockets 302 is illustrated. In some embodiments, the testing board 300 may be configured (e.g., sized and shaped) so as to form a connecting portion 400 and a testing portion 402. In such an embodiment, the connecting portion 400, including the edge connector 106 described above with reference to FIGS. 1-2, may define a first width $W_1$, and the testing portion 402 may define a second width $W_2$. As shown in FIG. 4, the first width $W_1$ of the connection portion 400 may be less than the second width $W_2$ of the testing portion 402 so as to form a t-shaped testing board 300. While described with reference to a t-shaped testing board 300 with eight (8) sockets 302, the present disclosure contemplates that any number of sockets 302 may be supported by the testing board 300 in any configuration. Furthermore, the present disclosure contemplates that the testing board 300 may be any shape or size so as to be received by a corresponding backplane element (e.g., backplane element 104 in FIG. 1).

With reference to FIGS. 5-6A, a socket 302 configured to receive a substrate 500 supporting a plurality of optical transmitters 502 (e.g., VCSELs) is illustrated. As shown, the substrate 500 may be configured to be received by a socket 302 such that electrical signals received by the socket 302 (e.g., via electrical communication with the testing board 300) may be transmitted from the socket 302 to the substrate 500, and further transmitted to a plurality of optical transmitters 502 supported thereon. The plurality of optical transmitters 502 may be configured to convert the electricals signals to corresponding optical signals for transmission by the optical transmitters 502. As shown in FIG. 6A, the plurality of optical transmitters 502 may be connected with a contact point 602 of the substrate 500 via one or more wire bonds 600. As described hereinafter with regard to one or more testing methods applied to the plurality of optical transmitters 502, the connection of at least one optical transmitter 502 with a corresponding contact point 602 via the wire bond 600 may allow various parameters or outputs (e.g., an output voltage, an output current, an operating temperature, etc.) to be transmitted as electrical signals from the respective optical transmitter 502 to a control unit (e.g., the control unit 112 in FIG. 1) for analysis. In some embodiments, the substrate 500 received by the socket 302 may support sixteen (16) optical transmitters (e.g., VCSELs). While described in reference to sixteen (16) optical transmitters 502 supported by a single substrate 500, the present disclosure contemplates that any number of optical transmitters 502 may be supported by a corresponding substrate 500 in any configuration. Furthermore, with reference to FIG. 6-6A, the present disclosure contemplates that any orientation or configuration of wire bonds 600 and contact points 602 may be unitized by embodiments of the present invention such that one or more of the plurality of optical transmitters 502 is in electrical communication with a driver (e.g., driver 108).

With reference to FIG. 7, a bottom view of the sensor board 304 is illustrated. As shown, the bottom surface of the sensor board 304 may be configured to support one or more optical receivers 314 (e.g., photodiodes). When in an operational configuration, in which the bottom surface of the sensor board is substantially aligned with the testing board 300, each optical receiver 314 may be configured to receive optical signals transmitted by the plurality of optical transmitters 502 and configured to convert the optical signals to corresponding electrical signals. In some embodiments, the sensor board 304 may support eight (8) optical receivers 314. However, the present disclosure contemplates that any number of optical receivers 314 may be supported by the sensor board 304 so as to receive optical signals provided by the corresponding sockets 302 (via the plurality of optical transmitters 502) of the testing board 300. As would be evident to one of ordinary skill in the art in light of the present disclosure, the sensor board 304, in some embodiments, may support the same number of optical receivers 314 as the number of sockets 302 supported by the corresponding testing board 300. Furthermore the configuration or orientation of these optical receivers 314 may match that of the orientation of sockets 302 of the testing board 300 so as allow for optical communication between the optoelectronic elements supported thereon. In an example embodiment described herein, the sensor board 304 may define eight (8) optical receivers 314 positioned to substantially align with eight (8) corresponding sockets 302 of the testing board 300 such that the set of sixteen (16) optical transmitters 502 of each socket 302 is in optical communication with a single corresponding optical receiver 314. Accordingly, in such an embodiment, the sensor board 304 supports eight (8) optical receivers 314 in optical communication with a maximum of one hundred twenty-eight (128) optical transmitters 502.

As described below in detail with reference to particular testing methods, the testing system 100 may serve to provide electrical inputs to a plurality of optical transmitters 502 and monitor corresponding output parameters. By way of example, with reference to FIGS. 1, 3, and 5, the control unit 112 may execute a testing method by directing the driver 108 to provide a current input to at least one of the plurality of optical transmitters 502. The control unit 112 may provide this command via electrical signals transmitted to the driver 108. The driver 108 may then provide a corresponding current input to the testing unit 102 via electrical signals transmitted by the driver 108 to the testing unit via the rigid-flex PCB 110, the backplane 104, and the edge connector 106 (FIG. 1). The electrical signals may then be provided to at least one optical transmitter 502 via electrical traces of the testing board 300, socket 302, and substrate 500. The optical transmitter 502 may convert the electrical signals to optical signals and may transmit the optical signals to the corresponding optical receiver 314 of the sensor board 304. The optical receiver 314 may then convert the optical signals to corresponding electrical signals. These electrical signals may be provided to the control unit 112 via the driver 108 and backplane 104 through the connection provided by connectors 308, 310. The control unit 112 may analysis and/or determine various parameters or outputs of the optical transmitter 502 based upon these electrical signals to determine passage or failure of the optical transmitter. Although described as providing a current input to a single optical transmitter, the present disclosure contemplates that the control unit 112 and/or driver 108 may selectively apply inputs to any number or combination of the plurality of optical transmitters 502.

Optical Transmitter Testing Methods

The apparatus 200, method, and computer program product of an example embodiment will now be described in conjunction with the operations illustrated in FIGS. 8-12.

With reference to FIG. 8, a flow chart is provided that illustrates an optical transmitter testing method 800 for use with some embodiments described herein. The method 800 may include performing a continuity testing method, an LIV testing method, an IV testing method, and a stress testing method on an optical transmitter 502. The apparatus 200 (e.g., the control unit 112 and/or driver 108) may include means, such as the processor 202 of FIG. 2 or the like, for performing a continuity testing method at Block 802. The continuity testing method (e.g., method 900 in FIG. 9) may be used to determine if the elements of the system for testing optical transmitters 100 are correctly installed, such that the testing methods can be carried out to provide valid results. The apparatus 200 may further include means, such as the processor 202 or the like, for performing an LIV testing method at Block 804. The LIV testing method (e.g., method 1000 in FIG. 10) may be used to determine the periodic characterization of the IV curve (e.g., current (I) versus voltage (V)) of at least one optical transmitter of the plurality of optical transmitters (e.g., the optical transmitters 502 in FIG. 5) along with a periodic characterization of the optical power of each respective optical transmitter. The apparatus 200 (e.g., the control unit 112 and/or driver 108) may again include means, such as the processor 202 or the like, for performing a continuity testing method at Block 806. The apparatus 200 may further include means, such as the processor 202 or the like, for performing an IV testing method at Block 808. The IV testing method (e.g., method 1100 in FIG. 11) may be used to determine the periodic characterization of the IV curve (e.g., current (I) versus voltage (V)) of at least one optical transmitter of the plurality of optical transmitters 502 over a testing time. The apparatus 200 may also include means, such as the processor 202 or the like, for performing a stress testing method at Block 810. The stress testing method (e.g., method 1200 in FIG. 12)

may be used to predict the failure of at least one optical transmitter of the plurality of optical transmitters 502 by applying an increasing current input for an extended testing period. As shown, the method 800 may be repeated for any number of iterations over any length of testing time to meet applicable industry standards.

With reference to FIG. 9, a flowchart is provided that illustrates the continuity testing method 900 for use with some embodiments described herein. The apparatus 200 (e.g., the control unit 112 and/or driver 108 in FIG. 1) may include means, such as the processor 202 or the like, for applying a first constant current input to an optical transmitter 502 of a plurality of optical transmitters at Block 902. As described above, the control unit 112 and/or driver 108 may be configured to provide a current input to at least one optical transmitter 502 of a plurality of optical transmitters. In some embodiments, the current input at Block 902 may be selectively applied to particular optical transmitters 502 defined by a user or defined as a parameter of the continuity testing method 900.

The apparatus 200 (e.g., the control unit 112 and/or driver 108 in FIG. 1) may include means, such as the processor 202 or the like, for monitoring a first output voltage of the optical transmitter 502 at Block 904 and means for monitoring a first operating temperature of the corresponding substrate 500 supporting the optical transmitter 502 at Block 906. As described above, the control unit 112 may be in communication with one or more sensors configured to monitor various outputs of the optoelectronic elements of the system 100. At Block 904, the control unit 112 may be in electrical communication with a current sensor or transducer configured to monitor a current outputted by the optical transmitter 502 as a result of the current input by the driver 108. In other embodiments, the driver 108 and/or control unit 112 may calculate or otherwise determine the output voltage of the optical transmitter via application of Ohm's law. In particular, Ohm's law states that V=I·R, where V is voltage, I is current, and R is resistance (a characteristic of the optical transmitter 502). By utilizing an optical transmitter 502 with a particular resistance value and applying a constant current at Block 902, a change in the voltage of the optical transmitter 502 may be monitored using Ohm's law. Similarly, at Block 906, the control unit 112 may be in electrical communication with a thermometer or other temperature sensor configured to monitor an operating temperature of the substrate 500 supporting the optical transmitter 502.

The apparatus 200 (e.g., the control unit 112 and/or driver 108 in FIG. 1) may also include means, such as the processor 202 or the like, for determining a first voltage pass state or a first voltage fail state of the optical transmitter 502 based on a comparison of the first output voltage to a first output voltage threshold at Block 908. The first output voltage monitored by the control unit 112 at Block 904 may be compared to a first output voltage threshold at Block 908. In some embodiments, the first output voltage threshold may be a user-defined acceptable range of output voltage values, such that a first voltage pass state is determined in an instance in which the first output voltage satisfies the first output voltage threshold. Conversely, a first voltage fail state may be determined in an instance in which the first output voltage does not satisfy the first output voltage threshold. In some other embodiments, the first output voltage threshold may be determined with reference to an industry standard for optical transmitters 502.

The apparatus 200 (e.g., the control unit 112 and/or driver 108 in FIG. 1) may include means, such as the processor 202 or the like, for determining a first temperature pass state or a first temperature fail state of the optical transmitter 502 based on a comparison of the first operating temperature to a first operating temperature threshold at Block 910. The first operating temperature monitored by the control unit 112 at Block 906 may be compared to a first operating temperature threshold at Block 910. In some embodiments, the first operating temperature threshold may be a user-defined acceptable range of operating temperature values, such that the first temperature pass state is determined in an instance in which the first operating temperature satisfies the first operating temperature threshold. Conversely, a first operating temperature fail state may be determined in an instance in which the first operating temperature does not satisfy the first operating temperature threshold. In some other embodiments, the first operating temperature threshold may be determined with reference to an industry standard for substrates 500.

The apparatus 200 (e.g., the control unit 112 and/or driver 108 in FIG. 1) may include means, such as the processor 202 or the like, for determining a first pass state at Block 912 in an instance in which the first voltage pass state and the first temperature pass state are determined. By way of example, if the control unit 112 determines that the first output voltage of the optical transmitter 502 and the first operating temperature of the substrate 500 satisfy their respective thresholds, the apparatus 200 may determine a first pass state of the optical transmitter 502. In some embodiments, the control unit 112 may perform the continuity testing method 900 for each optical transmitter 502 of the testing unit 102 sequentially (e.g., one at a time). In other embodiments, the continuity testing method 900 may be performed on any number of optical transmitters simultaneously. In some further embodiments, the apparatus 200 may further include means, such as the processor 202 or the like for, maintaining a constant ambient temperature of the plurality of optical transmitters while performing the continuity testing method 900.

With reference to FIG. 10, a flowchart is provided that illustrates an LIV testing method 1000 for use with some embodiments described herein. In monitoring and determining the reliability of optical components (e.g., optical transmitters 502), the LIV testing method 1000 may be used to monitor not only the optical parameters (e.g., monitored via an IV testing method 1100), but also the electrical parameters (e.g., current) of the optical components. As above with reference to method 900, the apparatus 200 (e.g., the control unit 112 and/or driver 108 in FIG. 1) in method 1000 may include means, such as the processor 202 or the like, for applying a second constant current input to the optical transmitter 502 of the plurality of optical transmitters at Block 1002. Further, the apparatus 200 may also include means, such as the processor 202 or the like, for monitoring a second output voltage of the optical transmitter at Block 1004 and for monitoring a second operating temperature of the corresponding substrate supporting the optical transmitter at Block 1008. The control unit 112 may again be in electrical communication with various sensors in order to monitor the second output voltage and the second operating temperature at Blocks 1004, 1008.

Additionally, the apparatus 200 (e.g., the control unit 112 and/or driver 108 in FIG. 1) in method 1000 may include means, such as the processor 202 or the like, for monitoring a first sensor voltage of a corresponding optical receiver in optical communication with the optical transmitter at Block 1006. As described above with reference to FIG. 7, the system 100 may define one or more optical receivers 314 in optical communication with one or more optical transmitters 502. As such, the control unit 112, at Block 1006, may similarly monitor the voltage of the corresponding optical receiver 314 receiving optical signals from the at least one optical transmitter 502. This first sensor voltage output by the optical receiver 314 may be representative of the optical power of the optical transmitter 502.

The apparatus 200 (e.g., the control unit 112 and/or driver 108 in FIG. 1) may include means, such as the processor 202 or the like, for iteratively applying a modified second current input to the optical transmitter at Block 1010. As described above at Block 1002, the control unit 112 and/or driver 108 may modify the current input (e.g., increase the current input) in order to affect the outputs of the optical transmitters 502, the optical receiver 314, and/or the substrate 500. Following this application of the modified second current input to the optical transmitter 502 at Block 1010, the apparatus 200 may include means, such as the processor 202 or the like, for monitoring at least one third output voltage of the optical transmitter at Block 1012, monitoring at least one second sensor voltage of the corresponding optical receiver at Block 1014, and monitoring at least one third operating temperature of the corresponding substrate at Block 1016. In such a method 1000, the control unit 112 may collect or otherwise store these iterative outputs in order to predict the failure or reliability of the optical transmitter 512. Said another way, the control unit 112 may collect data corresponding to the output voltage of the optical transmitter, the sensor voltage of the optical receiver, and the operating temperature of the substrate from each iteration of the modified second current input. The control unit 112 may use this data to calculate various testing parameters described hereinafter.

The apparatus 200 (e.g., the control unit 112 and/or driver 108 in FIG. 1) may further include means, such as the processor 202 or the like, for calculating one or more first output parameters of the optical transmitter based on the second output voltage, the third output voltage, the second operating temperature, and the third operating temperature at Block 1018. In some embodiments, the first testing output parameters include at least one of a leakage current, an optical transmitter resistance, an optical threshold voltage, a resistance deviation, or a threshold voltage deviation. In some embodiments, additional system parameters may also be monitored by the method 1000 at various locations in the system 100. By way of example, an output current of a current source and/or optical transmitter (e.g., optical transmitter 502) may also be monitored at the current source and/or optical transmitter, respectively. Additionally, the apparatus 200 (e.g., the control unit 112 and/or driver 108 in FIG. 1) may include means, such as the processor 202 or the like, for calculating a first optical power drift parameter based on the first sensor voltage output and the second sensor voltage output at Block 1020.

The apparatus 200 (e.g., the control unit 112 and/or driver 108 in FIG. 1) may also include means, such as the processor 202 or the like for determining a first testing parameter pass state or a first testing parameter fail state of the optical transmitter 502 based on a comparison of the one or more first testing output parameters to a corresponding first testing parameter threshold at Block 1022. The first output parameters calculated by the control unit 112 at Block 1018 may be compared to one or more first testing parameter thresholds. In some embodiments, the first testing parameter thresholds may be user-defined acceptable ranges of first testing output parameters such that a first testing parameter pass state is determined in an instance in which the first testing output parameters satisfy the one or more first testing parameter thresholds. Conversely, a first testing parameter fail state may be determined in an instance in which the first testing output parameters do not satisfy the first testing parameter threshold.

The apparatus 200 (e.g., the control unit 112 and/or driver 108 in FIG. 1) may include means, such as the processor 202 or the like, for determining a first power drift pass state or a first power drift fail state of the optical transmitter 502 based on a comparison of the first optical power drift parameter to a first optical power drift threshold at Block 1024. The first optical power drift parameter calculated by the control unit 112 at Block 1020 may be compared to a first optical power drift threshold. In some embodiments, the first optical power drift threshold may be a user-defined acceptable range of optical power drift values such that the first optical power drift pass state is determined in an instance in which the first optical power drift parameter satisfies the first optical power drift threshold. Conversely, a first power drift fail state may be determined in an instance in which the first optical power drift parameter does not satisfy the first optical power drift threshold. In some other embodiments, the first optical power drift threshold may be determined with reference to an industry standard for optical transmitters 502.

The apparatus 200 (e.g., the control unit 112 and/or driver 108 in FIG. 1) may include means, such as the processor 202 or the like, for determining a second pass state in an instance in which the first testing parameter pass state and the first power drift pass state are determined at Block 1026. By way of example, if the control unit 112 determines that the first testing output parameters and the first optical power drift parameter of the optical transmitter 502 satisfy their respective thresholds, the apparatus 200 may determine a second pass state of the optical transmitter 502. In some embodiments, the control unit 112 may perform the LIV testing method 1000 for each optical transmitter 502 of the testing unit 102 sequentially (e.g., one at a time). In other embodiments, the LIV testing method 1000 may be performed on any number of optical transmitters simultaneously.

With reference to FIG. 11, a flowchart is provided that illustrates an IV testing method 1100 for use with some embodiments described herein. The IV testing method 1100 of FIG. 11 generally tracks the LIV testing method 1000 described above with reference to FIG. 10. However, the IV testing method 1100 of FIG. 11 does not monitor a first sensor voltage of a corresponding optical receiver 314 in optical communication with an optical transmitter 502 to subsequently determine an optical power drift parameter (e.g., at Block 1020 in FIG. 10), but instead provides for a first testing time during which the second constant current input is applied at Block 1102. For the sake of completeness, the apparatus 200 (e.g., the control unit 112 and/or driver 108 in FIG. 1) in method 1100 may include means, such as the processor 202 or the like, for applying a second constant current input to an optical transmitter 502 of a plurality of optical transmitters at Block 1102; for monitoring a second output voltage of the optical transmitter over the first testing time at Block 1104; and for monitoring a second operating temperature of a corresponding substrate supporting the optical transmitter over the first testing time at 1106. The apparatus 200 (e.g., the control unit 112 and/or driver 108 in FIG. 1) in method 1100 may also include means, such as the processor 202 or the like, for iteratively applying a modified second current input to the optical transmitter over the first testing time at 1108; for monitoring at least one third output voltage of the optical transmitter at Block 1110; and for monitoring at least one third operating temperature of the corresponding substrate at Block 1112. The apparatus 200

(e.g., the control unit 112 and/or driver 108 in FIG. 1) in method 1100 may further include means, such as the processor 202 or the like, for calculating one or more first testing output parameters of the optical transmitter based on the second output voltage, the third output voltage, the second operating temperature, and the third operating temperature at Block 1114; and for determining a second pass state or a second fail state of the optical transmitter based on a comparison of the one or more first testing output parameters to a corresponding first testing parameter threshold at Block 1116. In some embodiments, the first testing time is about 45 minutes. In some further embodiments, the control unit 112 may also perform the IV testing method 1100 for each optical transmitter 502 of the testing unit 102 sequentially (e.g., one at a time). In other embodiments, the IV testing method 1100 may be performed on any number of optical transmitters simultaneously.

With reference to FIG. 12, a flowchart is provided that illustrates a stress testing method 1200 for use with some embodiments described herein. The apparatus 200 (e.g., the control unit 112 and/or driver 108 in FIG. 1) may include means, such as the processor 202 or the like, for applying a third constant current input to an optical transmitter of a plurality of optical transmitters 502 for a second testing time at Block 1202. As described above, the control unit 112 and/or driver 108 may be configured to provide a current input to at least one optical transmitter 502 of a plurality of optical transmitters. In some embodiments, the current input at Block 1202 may be selectively applied to particular optical transmitters 502 defined by a user or defined as a parameter of the stress testing method 1200.

The apparatus 200 (e.g., the control unit 112 and/or driver 108 in FIG. 1) may include means, such as the processor 202 or the like, for monitoring a fourth output voltage of the optical transmitter over the second testing time at Block 1204 and for monitoring a fourth operating temperature of a corresponding substrate supporting the optical transmitter over the second testing time at Block 1206. As described above, the control unit 112 may be in communication with one or more sensors configured to monitor various outputs of the optoelectronic elements of the system 100. In some embodiments, the second testing time is about 60 minutes. Additionally, in some alternative embodiments, an ambient temperature of the plurality of optical transmitters 502 may be variable over the second testing time.

The apparatus 200 (e.g., the control unit 112 and/or driver 108 in FIG. 1) may also include means, such as the processor 202 or the like, for analyzing if the fourth output voltage is above a maximum output voltage and if the fourth operating temperature above a maximum operating temperature at Block 1208. In an instance in which the fourth output voltage is above a maximum output voltage or the fourth operating temperature is above the maximum operating temperature, the apparatus may determine failure of the optical transmitter at Block 1210.

The apparatus 200 (e.g., the control unit 112 and/or driver 108 in FIG. 1) may also include means, such as the processor 202 or the like, for analyzing if a first change in the output voltage is above a voltage variation threshold or if a first change in operating temperature is above a temperature variation threshold at Block 1212, if these maximum values are not exceeded by the fourth output voltage or the fourth operating temperature at Block 1208. In an instance in which the first change in the output voltage is above a voltage variation threshold or the operating temperature variation is above the temperature variation threshold, the apparatus 200 may determine failure of the optical transmitter at Block 1214. However, in an instance in which both analyses performed at Blocks 1208, 1212 are successful, the apparatus 200 may determine passage of the optical transmitter at Block 1216. In some embodiments, the control unit 112 may perform the stress testing method 1200 for each optical transmitter 502 of the testing unit 102 sequentially (e.g., one at a time). In other embodiments, the stress testing method 1200 may be performed on any number of optical transmitters simultaneously. Furthermore, the stress testing method 1200 may also be repeated with increasing current inputs (e.g., third constant current inputs at Block 1202) for an extended testing period (e.g., second testing time).

As described above, FIGS. 8-12 illustrate flowcharts of an apparatus 200, method, and computer program product according to example embodiments. Each of the output values, output testing parameters, and threshold values of the testing method described above may also relate to the reliability of optical transmitters. In particular, the testing methods provided herein may be used to predict the failure of optical transmitters. Further, it will be understood that each block of the flowcharts, and combinations of blocks in the flowcharts, may be implemented by various means, such as hardware, firmware, processor, circuitry, and/or other devices associated with execution of software including one or more computer program instructions. For example, one or more of the procedures described above may be embodied by computer program instructions. In this regard, the computer program instructions which embody the procedures described above may be stored by a memory 204 of an apparatus 200 employing an embodiment of the present invention and executed by a processor 202 of the apparatus 200 (FIG. 2). As will be appreciated, any such computer program instructions may be loaded onto a computer or other programmable device (e.g., hardware) to produce a machine, such that the resulting computer or other programmable device implements the functions specified in the flowchart blocks. These computer program instructions may also be stored in a computer-readable memory that may direct a computer or other programmable device to function in a particular manner, such that the instructions stored in the computer-readable memory produce an article of manufacture the execution of which implements the function specified in the flowchart blocks. The computer program instructions may also be loaded onto a computer or other programmable device to cause a series of operations to be performed on the computer or other programmable device to produce a computer-implemented process such that the instructions which execute on the computer or other programmable device provide operations for implementing the functions specified in the flowchart blocks.

Accordingly, blocks of the flowcharts support combinations of means for performing the specified functions and combinations of operations for performing the specified functions for performing the specified functions. It will also be understood that one or more blocks of the flowcharts, and combinations of blocks in the flowcharts, may be implemented by special purpose hardware-based computer systems which perform the specified functions, or combinations of special purpose hardware and computer instructions.

In some embodiments, certain ones of the operations above may be modified or further amplified. Furthermore, in some embodiments, additional optional operations may be included. Modifications, additions, or amplifications to the operations above may be performed in other orders and/or combinations.

Many modifications and other embodiments of the inventions set forth herein will come to mind to one skilled in the art to which these inventions pertain having the benefit of teachings presented in the foregoing descriptions and the associated drawings. Although the figures only show certain components of the apparatus and systems described herein, it is understood that various other components (e.g., components of printed circuit boards, transceivers, cables, etc.) may be used in conjunction with the cage receptacle assembly. Therefore, it is to be understood that the inventions are not to be limited to the specific embodiments disclosed and that modifications and other embodiments are intended to be included within the scope of the appended claims.

What is claimed is:

1. A system for testing optical transmitters comprising:
   a testing unit comprising:
      a testing board supporting one or more sockets via a top surface of the testing board, wherein each socket is configured to receive a substrate supporting a plurality of optical transmitters, wherein each optical transmitter is configured to convert electrical signals to corresponding optical signals for transmission by the optical transmitter;
      a sensor board supporting one or more optical receivers via a bottom surface of the sensor board, wherein each optical receiver is configured to receive the optical signals transmitted by the plurality of optical transmitters and configured to convert the optical signals to corresponding electrical signals; and
      one or more support rails attached to one of the testing board or the sensor board and configured to engage the other of the testing board or the sensor board, and the one or more support rails are configured to substantially align each of the one or more optical receivers of the sensor board with a corresponding socket of the testing board such that the plurality of optical transmitters is in optical communication with the one or more optical receivers in an operational mode of the testing unit; and
   a driver in electrical communication with the plurality of optical transmitters of the one or more sockets and in electrical communication with the one or more optical receivers of the sensor board, wherein the driver is configured to apply a current input to at least one of the plurality of optical transmitters and configured to monitor a corresponding output parameter.

2. The system according to claim 1, wherein the driver is further configured to determine a pass state or a fail state of the plurality of optical transmitters based on a comparison of the output parameter to an output parameter threshold.

3. The system according to claim 1, further comprising a backplane element supporting one or more testing units, wherein the backplane element is in electrical communication with the one or more testing units.

4. The system according to claim 3, wherein the backplane element supports four testing units.

5. The system according to claim 3, wherein the driver is electrically connected to the backplane element via a rigid-flex printed circuit board.

6. The system according to claim 3, further comprising four drivers, wherein each driver is configured to provide a current to one of the testing units supported by the backplane element.

7. The system according to claim 1, further comprising a control unit in electrical communication with the driver and configured to execute a testing method with respect to the plurality of optical transmitters of the testing unit.

8. The system according to claim 1, wherein each testing board supports eight sockets.

9. The system according to claim 1, wherein each socket is configured to receive a substrate supporting sixteen optical transmitters.

10. The system according to claim 1, wherein the plurality of optical transmitters comprise vertical-cavity surface-emitting lasers.

11. The system according to claim 1, wherein the one or more optical receivers comprise photodiodes.

12. The system according to claim 1, wherein the distance between the socket and the sensor board is less than 9.33 mm.

13. The system according to claim 1, wherein the sensor board further comprises a male connector configured to be received by a corresponding female connector defined by the testing board.

14. The system according to claim 1, wherein the testing unit defines a connecting portion having a first width and comprising an edge connector and defines a testing portion having a second width, wherein the second width is larger than the first width.

15. The system according to claim 14, wherein the edge connector is configured to be received by a corresponding connector of a backplane element.

16. The system according to claim 15, wherein the driver is in electrical communication with the backplane element via a rigid-flex printed circuit board, and the backplane element is in electrical communication with the testing unit via the edge connector such that the current input applied by the driver is received by the plurality of optical transmitters via the backplane element.

17. A method of manufacturing a system for testing optical transmitters, the method comprising:
   providing a testing unit comprising:
      a testing board supporting one or more sockets via a top surface of the testing board, wherein each socket is configured to receive a substrate supporting a plurality of optical transmitters, wherein each optical transmitter is configured to convert electrical signals to corresponding optical signals for transmission by the optical transmitter;
      a sensor board supporting one or more optical receivers via a bottom surface of the sensor board, wherein each optical receiver is configured to receive the optical signals transmitted by the plurality of optical transmitters and configured to convert the optical signals to corresponding electrical signals; and
      one or more support rails attached to one of the testing board or the sensor board and configured to engage the other of the testing board or the sensor board, and the one or more support rails are configured to substantially align each of the one or more optical receivers of the sensor board with a corresponding socket of the testing board such that the plurality of optical transmitters is in optical communication with the one or more optical receivers in an operational mode of the testing unit; and
   providing a driver in electrical communication with the plurality of optical transmitters of the one or more sockets and in electrical communication with the one or more optical receivers of the sensor board, wherein the driver is configured to apply a current input to at least one of the plurality of optical transmitters and configured to monitor a corresponding output parameter.

18. The method of manufacturing according to claim 17, further comprising providing a backplane element configured to support one or more testing units.

19. The method of manufacturing according to claim 18, further comprising providing one or more drivers, wherein each driver is configured to provide a current to one of the testing units supported by the backplane element.

20. The method of manufacturing according to claim 17, further comprising providing a control unit in electrical communication with the driver and configured to execute a testing method with respect to the plurality of optical transmitters of the testing unit.

* * * * *